US012282268B2

(12) United States Patent
Oura et al.

(10) Patent No.: US 12,282,268 B2
(45) Date of Patent: Apr. 22, 2025

(54) DEVELOPING ROLL AND DEVELOPING DEVICE FOR USE IN IMAGE-FORMING APPARATUS USING ELECTROPHOTOGRAPHY

(71) Applicant: NOK CORPORATION, Tokyo (JP)

(72) Inventors: Kosuke Oura, Kanagawa (JP); Norimasa Hosonuma, Kanagawa (JP); Atsushi Ikeda, Kanagawa (JP); Yu Akai, Kanagawa (JP); Satoshi Fukuoka, Kanagawa (JP); Kenji Sasaki, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/273,185

(22) PCT Filed: Dec. 3, 2021

(86) PCT No.: PCT/JP2021/044522
§ 371 (c)(1),
(2) Date: Jul. 19, 2023

(87) PCT Pub. No.: WO2022/158139
PCT Pub. Date: Jul. 28, 2022

(65) Prior Publication Data

US 2024/0142890 A1 May 2, 2024

(30) Foreign Application Priority Data

Jan. 21, 2021 (JP) ................................ 2021-007822

(51) Int. Cl.
*G03G 15/08* (2006.01)

(52) U.S. Cl.
CPC ..... *G03G 15/0808* (2013.01); *G03G 15/0881* (2013.01)

(58) Field of Classification Search
USPC .......................................................... 399/286
See application file for complete search history.

(56) References Cited

U.S. PATENT DOCUMENTS

2003/0123899 A1 7/2003 Kamimura
2006/0127125 A1 6/2006 Mizumoto
2013/0089362 A1 4/2013 Kuroda et al.

FOREIGN PATENT DOCUMENTS

JP 5-72883 3/1993
JP 9-244397 9/1997
(Continued)

OTHER PUBLICATIONS

Japan Office Action issued in JP Application No. 2022-577018, dated Feb. 20, 2024.
(Continued)

*Primary Examiner* — Quana Grainger
(74) *Attorney, Agent, or Firm* — GREENBLUM & BERNSTEIN, P.L.C.

(57) ABSTRACT

A developing roll for use in an image-forming apparatus using electrophotography includes a cylindrical core made of metal; an annular elastic layer made of rubber and arranged around the core; and an annular surface layer arranged around the elastic layer. The surface layer includes a central portion and end portions. The central portion is located at the center of the developing roll in the longitudinal direction, the end portions are located at opposite end portions of the developing roll in the longitudinal direction. A coefficient of kinetic friction of the outer peripheral surface of each end portion of the surface layer is less than or equal to 0.1, and a ten-point average roughness $R_z$ of the outer peripheral surface of each end portion of the surface layer is less than or equal to 1.8 μm.

4 Claims, 3 Drawing Sheets

(56) References Cited

FOREIGN PATENT DOCUMENTS

| | | | | | |
|---|---|---|---|---|---|
| JP | H9-244397 | A | | 9/1997 | |
| JP | 11288151 | A | * | 10/1999 | |
| JP | 2001-323925 | | | 11/2001 | |
| JP | 2003-195628 | | | 7/2003 | |
| JP | 2003-195628 | A | | 7/2003 | |
| JP | 2007-248673 | A | | 9/2007 | |
| JP | 2009-222970 | | | 10/2009 | |
| JP | 2011-17968 | | | 1/2011 | |
| JP | 2013073130 | A | * | 4/2013 | ............ G03G 15/08 |
| JP | 2013-83728 | | | 5/2013 | |
| JP | 2013-83728 | A | | 5/2013 | |
| JP | 2020-46467 | A | | 3/2020 | |

OTHER PUBLICATIONS

ISR for PCT/JP2021/044522, dated Jan. 25, 2022 (w/ translation).
Japan, Notice of Reasons for Refusal received in JP patent application No. 2022-577018, dated Jun. 4, 2024.
Japan, Decision of Refusal received in JP Patent Application No. 2022-577018, dated Aug. 27, 2024.
Japan, Decision of Dismissal of Amendment received in JP Patent Application No. 2022-577018, dated Aug. 27, 2024.
Extended European search report issued in counterpart EP patent application (EP21921241.2), dated Nov. 19, 2024.

* cited by examiner

| | | Sample 1 | Sample 2 | Sample 3 |
|---|---|---|---|---|
| Central Portion of Surface Layer | Surface Roughness Rz (μm) | 4.1 | 4.1 | 4.1 |
| | Coefficient of Kinetic Friction | 0.8 | 0.8 | 0.8 |
| End Portions of Surface Layer | Surface Roughness Rz (μm) | 1.8 | 1.8 | 4.1 |
| | Coefficient of Kinetic Friction | 0.1 | 0.1 | 0.8 |
| | Length (mm) | 10 | 5 | - |
| Leakage of Toner | | None | Present | Present |

DEVELOPING ROLL AND DEVELOPING DEVICE FOR USE IN IMAGE-FORMING APPARATUS USING ELECTROPHOTOGRAPHY

CROSS REFERENCE TO RELATED APPLICATIONS

The present application is a national phase application of International Patent Application No. PCT/JP2021/044522 filed on Dec. 3, 2021, which claims the benefit of Japanese Patent Application No. 2021-007822, filed on Jan. 21, 2021. The contents of these applications are incorporated herein by reference in their entirety.

BACKGROUND

Technical Field

The present disclosure relates to a developing roll and a developing device for an image-forming apparatus that uses electrophotography.

Related Art

An image-forming device that uses electrophotography is provided with a developing device that supplies a developer, that is, toner to a photoconductor drum. The developing device includes a toner container and a developing roll. Toner stuck to the outer peripheral surface of the developing roll is supplied to the photoconductor drum with the rotation of the developing roll. The photoconductor drum has an electrostatic latent image formed thereon, and a visible toner image is produced as toner particles are transferred from the developing roll to the electrostatic latent image due to the Coulomb's force.

Among portions of the toner stuck to the entire outer peripheral surface of the developing roll, those not transferred to the photoconductor drum (i.e., those not used to form an image) are recovered into a cartridge of the developing device. It is preferable that all portions of the toner not used to form an image be recovered into the cartridge. In addition, as leakage of the toner from the cartridge should be avoided, the cartridge is provided with a seal member surrounding an end portion of the developing roll.

A measure to reduce the leakage of the toner is also taken on the developing roll that contacts the seal member. Japanese Patent Application Publication No. 2020-46467 discloses a developing roll with a coat layer containing resin particles in which end portions of the coat layer contain a fluorine resin. Japanese Patent Application Publication No. 2013-083728 discloses that each of opposite end portions of the outer peripheral surface of a roll that contacts a seal member has a coefficient of friction of less than or equal to 0.15. Japanese Patent Application Publication No. 2007-248673 discloses a developing roll in which each of end portions of the roll has a surface roughness Ra smaller than that of the central portion of the roll.

The present disclosure provides a developing roll and a developing device each capable of reducing leakage of toner for a long period of time.

SUMMARY

A developing roll according to an aspect of the present disclosure is used in an image-forming apparatus that uses electrophotography. The developing roll includes a cylindrical core made of metal, an annular elastic layer made of rubber and arranged around the core, and an annular surface layer arranged around the elastic layer. The surface layer includes a central portion and end portions, the central portion being located at the center of the developing roll in the longitudinal direction, the end portions being located at opposite end portions of the developing roll in the longitudinal direction. A coefficient of kinetic friction of the outer peripheral surface of each end portion of the surface layer is less than or equal to 0.1, and a ten-point average roughness $R_z$ of the outer peripheral surface of each end portion of the surface layer is less than or equal to 1.8 μm.

The outer peripheral surface of each end portion of the surface layer of the developing roll slidably contacts a seal member that is adapted to reduce leakage of toner particles from a toner container. In such an aspect, as the coefficient of kinetic friction of each end portion of the surface layer is low and the ten-point average roughness $R_z$ thereof is also small, damages to the seal member are small, and thus, leakage of toner can be reduced for a long period of time.

DETAILED DESCRIPTION

Hereinafter, various embodiments according to the present disclosure will be described with reference to the accompanying drawings. The scale of the drawings is not necessarily accurate, and some of the features may be exaggerated or omitted.

Figure 1:
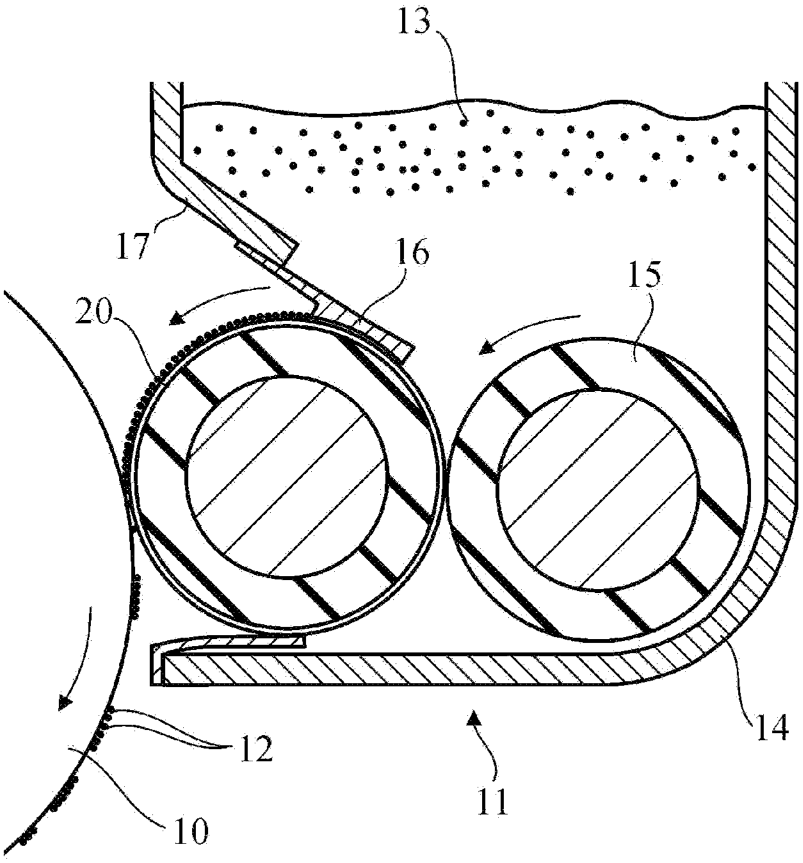
FIG. 1 is a view illustrating a usage state of a developing roll according to an embodiment of the present disclosure.

As illustrated in FIG. 1, an image-forming apparatus that uses electrophotography includes a photoconductor drum 10 and a developing device 11. The photoconductor drum 10 rotates in the direction of an arrow. The developing device 11 supplies toner particles 12 as a developer to the photoconductor drum 10. The surface of the photoconductor drum 10 has an electrostatic latent image formed thereon by a latent image forming device (not illustrated), and a visible toner image of the toner particles 12 is produced on the outer peripheral surface of the photoconductor drum 10 as the toner particles 12 are transferred from the developing device 11 to the electrostatic latent image.

The developing device 11 includes a toner container (i.e., a cartridge) 14 that stores an aggregate 13 of toner particles, an elastic roll 15 entirely arranged in the toner container 14, a developing roll 20 partially arranged in the toner container 14, and a doctor blade 16 (i.e., a regulatory blade) supported on the toner container 14. The elastic roll 15 is pressed against the developing roll 20, and the developing roll 20 is pressed against the photoconductor drum 10. The elastic roll 15 and the developing roll 20 are respectively rotated in directions indicated by arrows so that a substantially constant amount of toner particles in the toner container 14 sticks to the developing roll 20. Therefore, a thin layer of toner particles is formed on the outer peripheral surface of the developing roll 20. With the rotation of the developing roll 20, the toner particles stuck to the developing roll 20 are conveyed toward the photoconductor drum 10.

The doctor blade 16, which is arranged at an outlet for toner particles of the toner container 14, is supported by a support plate 17 fixed to the toner container 14. The doctor blade 16 is pressed against the outer peripheral surface of the developing roll 20, and regulates the amount of toner particles to be conveyed from the toner container 14 by sticking to the developing roll 20. In this manner, the developing roll 20 is allowed to contact each of the photoconductor drum 10, the elastic roll 15, and the doctor blade 16 with a certain degree of force.

Though not illustrated, the developing device 11 may be provided with a member that stirs the aggregate 13 of toner particles in the toner container 14, such as a screw that conveys the toner particles in the toner container 14, for example.

Figure 2:
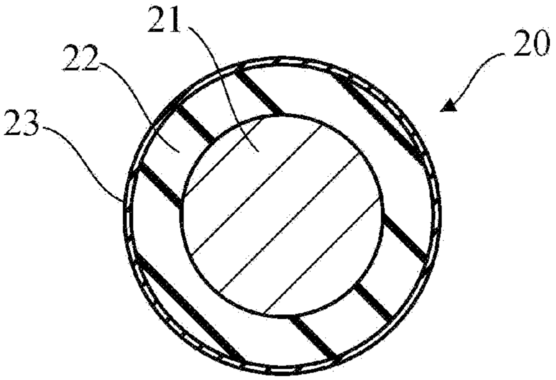
FIG. 2 is a cross-sectional view of the developing roll according to the embodiment.

As illustrated in FIG. 2, the developing roll 20 includes a cylindrical core 21 made of metal, an annular elastic layer 22 made of rubber with a uniform thickness and arranged around the core 21, and an annular surface layer 23 made of rubber with a uniform thickness and arranged around the elastic layer 22. The diameter of the core 21 is several mm, the thickness of the elastic layer 22 is 1 to 3 mm, and the thickness of the surface layer 23 is several μm to several ten μm.

The elastic layer 22 is formed of silicone rubber. The elastic layer 22 is provided to secure elasticity of the developing roll 20.

The surface layer 23 is provided to increase wear resistance of the surface of the developing roll 20. Therefore, the components of the material of the surface layer 23 are different from those of the elastic layer 22.

Figure 3:
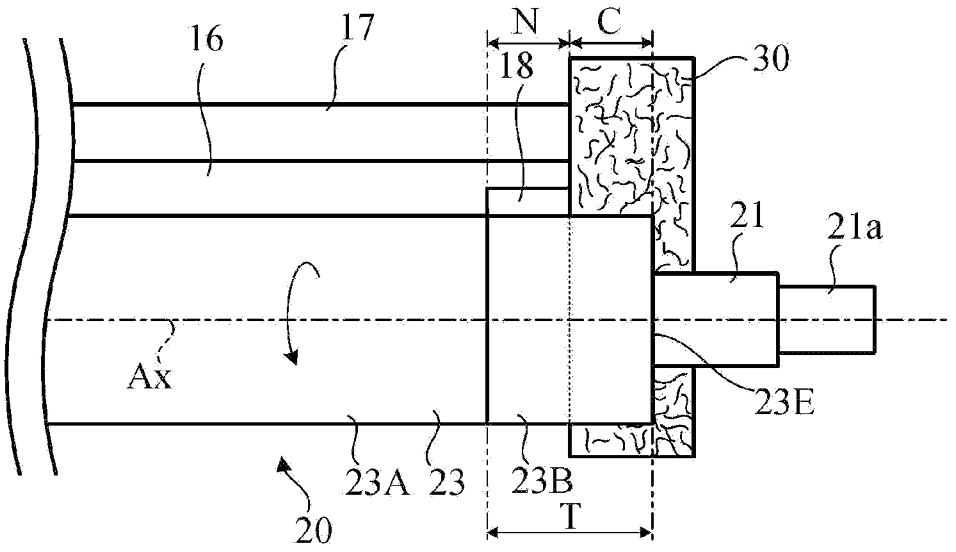
FIG. 3 is a front view of a developing roll of a sample according to an embodiment.

FIG. 3 illustrates one end portion of the developing roll 20 and its periphery. Though not illustrated, another end portion of the developing roll 20 has a configuration symmetrical to that in FIG. 3. The core 21 extends outward beyond the elastic layer 22 and the surface layer 23 in the axis direction of the developing roll 20. That is, the core 21 protrudes from an end edge 23E of the surface layer 23 (which is also an end edge of the elastic layer 22). An end portion 21*a* of the core 21 is supported by a bearing (not illustrated) so that the developing roll 20 is rotatable about an axis Ax.

Each of opposite end portions of the developing roll 20 is surrounded by a seal member 30. The seal member 30 is formed of a nonwoven fabric, for example, felt. The seal member 30 is supported and secured on the toner container 14 (which is not illustrated in FIG. 3), and prevents or reduces leakage of toner particles from the toner container 14. As illustrated in FIG. 3, the outer peripheral surface of each end portion of the surface layer 23 and the outer peripheral surface of the core 21 slidably contact the seal member 30. A contact length C between each end portion of the surface layer 23 of the developing roll 20 and the seal member 30 is 5 mm, for example.

The foregoing doctor blade 16 is adapted to apply pressure to the outer peripheral surface of the developing roll 20, and electrically charges toner particles with a frictional force, and thus allows the toner particles to stick to the developing roll 20. As described above, the toner particles, which have stuck to the developing roll 20 by being electrically charged, are transferred to the electrostatic latent image on the photoconductor drum 10. Therefore, the doctor blade 16 contacts the center of the developing roll 20 that contributes to forming an image, but does not contact the opposite end portions of the developing roll 20. In this embodiment, a cutout 18 is formed in the doctor blade 16 around each of the opposite end portions of the developing roll 20. The length N of the cutout 18 is 5 mm, for example.

To reduce leakage of toner particles through a gap between the seal member 30 and the developing roll 20, in the surface layer 23 of the developing roll 20, the end portions 23B located at opposite end portions of the developing roll 20 in the longitudinal direction are formed of a material different from a material of a central portion 23A located at the center of the developing roll 20 in the longitudinal direction. Specifically, the central portion 23A of the surface layer 23 is made of a urethane resin, and the end portions 23B of the surface layer 23 are made of a silicone resin. The end portions 23B are flush with the central portion 23A.

In an embodiment, the central portion 23A of the surface layer 23 was produced as follows.

First, the following materials were mixed in a first stage.

16.5 weight % of urethane-modified hexamethylene diisocyanate with a solid content of 80 weight % (grade "E402-80B" of "DURANATE" (product name) manufactured by Asahi Kasei Corporation (Tokyo, Japan)), 36.7 weight % of reactive silicone oil ("X-22-160AS" (product name) manufactured by Shin-Etsu Chemical Co., Ltd. (Tokyo, Japan)), and 46.8 weight % of butyl acetate as a diluent solvent.

Then, the mixture was left at 120° C. for 3 hours to promote the reaction of the components and thus produced a prepolymer.

Next, the following materials were mixed in a second stage.

31.0 weight % of the prepolymer produced in the first stage, 4.8 weight % of isocyanate with a solid content of 75 weight % ("Desmodur L 75" (product name) manufactured by Sumika Covestro Urethane Co., Ltd. (Hyogo, Japan)) as a binder, 17.9 weight % of a carbon dispersion liquid with a solid content of 20 to 30 weight % ("MHI-BK" (product name) manufactured by Mikuni-Color Ltd. (Hyogo, Japan)), and 43.7 weight % of butyl acetate as a diluent solvent.

Further, in a third stage, 2.6 weight % of silicone rubber particles was added to the mixture obtained in the second stage, and then a coating liquid was obtained. The silicone rubber particles were "EP-2720" (product name) manufactured by DuPont Toray Specialty Materials K.K. (Tokyo, Japan). The hardness of the silicone rubber particles measured using a durometer ("Type A" compliant with "JIS K 6253" and "ISO 7619") was 70 degrees. The average particle diameter of the silicone rubber particles was 2 μm.

In a fourth stage, a region around the central portion of the elastic layer 22 in the axis direction was coated with the coating liquid, the coated coating liquid was dried, and then the central portion 23A of the surface layer 23 was formed.

In an embodiment, the end portions 23B of the surface layer 23 were produced as follows.

A method for producing a prepolymer in a first stage is the same as that for the central portion 23A.

Next, in a second stage, the following materials were mixed.

31.5 weight % of the prepolymer produced in the first stage, 4.9 weight % of isocyanate ("Desmodur L 75" (product name)) as a binder, 18.2 weight % of a carbon dispersion liquid ("MHI-BK" (product name)), 1.0 weight % of a silicone resin with a solid content of 100 weight % ("MODIPER FS700" (product name) manufactured by NOF CORPORATION (Tokyo, Japan)), and 44.4 weight % of butyl acetate as a diluent solvent.

In a third stage, regions around the opposite end portions of the elastic layer 22 in the axis direction were coated with the coating liquid obtained in the second stage, the coated coating liquid was dried, and then the end portions 23B of the surface layer 23 were formed.

The foregoing components were mixed to form a dispersion liquid in which the binder and the diluent solvent are mixed.

The Applicant prepared a plurality of samples the end portions 23B made of a silicone resin of which are different in lengths with each other, and conducted an experiment on each sample to determine whether it is possible to suppress leakage of toner particles through the gap between the seal member 30 and the developing roll 20.

In each sample, a diameter of the core 21 was 6 mm, a thickness of the elastic layer 22 was 1.5 mm, and a thickness of the surface layer 23 was 10 μm±2 μm. The contact length C between each end portion of the surface layer 23 of the developing roll 20 and the seal member 30 was 5 mm. A length N of the cutout 18 of the doctor blade 16 was 5 mm.

FIG. 3 illustrates a sample 1. The length T of the end portion 23B made of a silicone resin from an end edge 23E of the surface layer 23 of the sample 1 was 10 mm.

Figure 4:
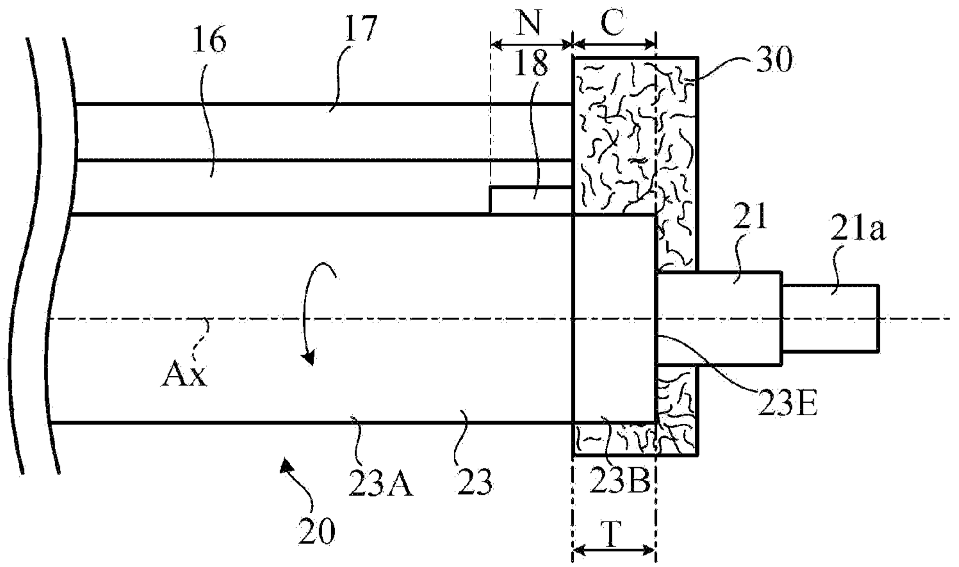
FIG. 4 is a front view of a developing roll of another sample according to an embodiment.

FIG. 4 illustrates a sample 2. The length T of the end portion 23B made of a silicone resin from an end edge 23E of the surface layer 23 of the sample 2 was 5 mm.

Figures 5, 6:
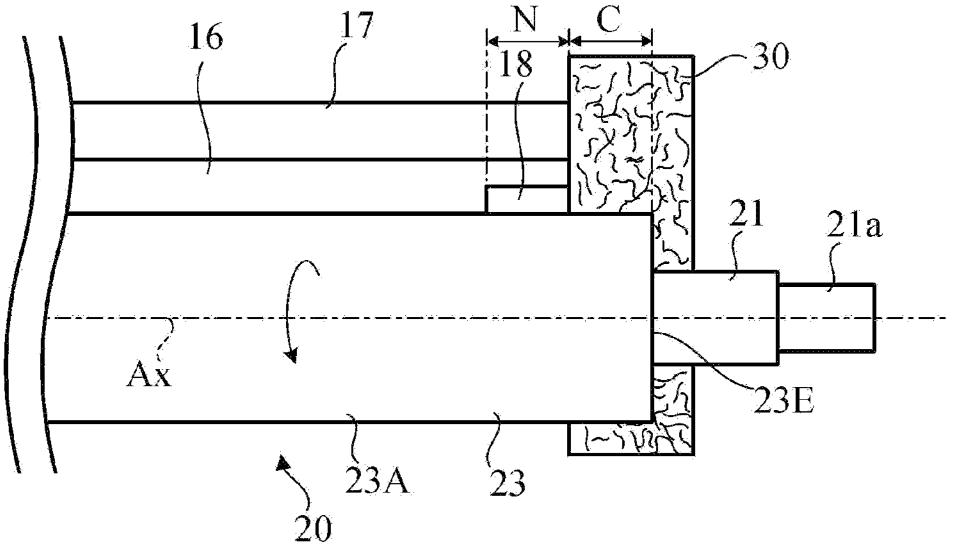
FIG. 5 is a front view of a developing roll of still another sample according to an embodiment.
FIG. 6 is a table illustrating parameters of each sample and the results of an experiment on leakage of toner.

FIG. 5 illustrates a sample 3. The length T of the end portion 23B made of a silicone resin from an end edge 23E of the surface layer 23 of the sample 3 was 0 mm. That is, the entire surface layer 23 was made of a urethane resin. In other words, the entire surface layer 23 was the central portion 23A.

FIG. 6 is a table illustrating parameters of each sample and the results of an experiment on the leakage of toner.

The surface roughness (i.e., ten-point average roughness $R_z$) of the outer peripheral surface of the surface layer 23 of each sample was measured using a contact-type surface roughness measuring instrument. The measuring instrument was Surfcorder "SE500" manufactured by Kosaka Laboratory Ltd. (Tokyo, Japan). In the SE500, a radius of a stylus was 2 μm, a tip angle of the stylus was 60 degrees, and a contact force was 0.75 mN. The measurement cutoff value λc was 0.8 mm, the roughness measurement length (i.e., reference length) was 4 mm, and the feed rate of the stylus was 0.5 mm/sec. The measured portion was the central portion of each sample in the longitudinal direction.

The coefficient of kinetic friction of the outer peripheral surface of the surface layer 23 of each sample was measured using a friction coefficient measuring instrument (a surface property tester "TYPE:14" (product name) manufactured by Shinto Scientific Co., Ltd. (Tokyo, Japan)) in compliance with ASTM D 1894 under the following measurement conditions. A load applied to the surface layer 23 using an iron-ball indenter was 50 gf. The measurement width was 1 cm. The measurement rate was 50 mm/sec.

The samples 1 and 2 differ only in the length T of the end portion 23B. Regarding the sample 3, since the entire surface layer 23 is made of a urethane resin, the roughness $R_z$ and the coefficients of kinetic friction of the central portion and the end portions were the same with each other, respectively.

For the experiment on the leakage of toner, each sample was loaded into a toner cartridge, that is, the toner container 14 for a color printer "HL-L8360CDW" (product name) manufactured by Brother Industries, Ltd. (Aichi, Japan). The toner cartridge was TN-493M manufactured by Brother Industries, Ltd.

During the experiment, the developing roll 20 in the cartridge was rotated at a rotating speed of 100 rpm without the cartridge being loaded into the printer. Then, the presence or absence of leakage of toner particles was visually observed for 30 minutes or longer. 30 minutes correspond to the time required to print 500 sheets of A4 paper with the printer.

As is obvious from FIG. 6, the sample 1 had no leakage of toner particles for 30 minutes or longer. However, each of the samples 2 and 3 had a leakage of toner particles within 30 minutes.

Therefore, the coefficient of kinetic friction of the outer peripheral surface of each end portion 23B of the surface layer 23 is preferably lower than that of the central portion 23A of the surface layer 23, and the ten-point average roughness $R_z$ of the outer peripheral surface of each end portion 23B of the surface layer 23 is preferably smaller than that of the central portion 23A of the surface layer 23. More specifically, the coefficient of kinetic friction of the outer peripheral surface of each end portion 23B of the surface layer 23 is preferably less than or equal to 0.1, and the ten-point average roughness $R_z$ of the outer peripheral surface of each end portion 23B of the surface layer 23 is preferably less than or equal to 1.8 μm. In the experiment, when the coefficient of kinetic friction of the outer peripheral surface of each end portion 23B was 0.1, there was no leakage of toner. When the coefficient of kinetic friction of each end portion 23B of the surface layer 23 is low, it is considered that damages to the seal member 30 are small, and thus, leakage of toner can be reduced for a long period of time. Therefore, when the coefficient of kinetic friction of the outer peripheral surface of each end portion 23B is less than 0.1, it is still expected that there is no leakage of toner. Meanwhile, in the experiment, when the ten-point average roughness $R_z$ of the outer peripheral surface of each end portion 23B was 1.8 μm, there was no leakage of toner. When the ten-point average roughness $R_z$ of each end portion 23B of the surface layer 23 is small, it is considered that damages to the seal member 30 are small, and thus, leakage of toner can be reduced for a long period of time. Therefore, when the ten-point average roughness $R_z$ of the outer peripheral surface of each end portion 23B is less than 1.8 μm, it is still expected that there is no leakage of toner.

Further, from the results of comparison of the samples 1 and 2, it is found that the length T of the end portion 23B of the surface layer 23 from the end edge 23E of the surface layer 23 is preferably greater than or equal to 10 mm. In the experiment, when the length T was 10 mm, there was no leakage of toner. The central portion 23A of the surface layer 23 is formed of a material to which toner is likely to stick, while each end portion 23B of the surface layer 23 is formed of a material to which toner is unlikely to stick. When the length T of each end portion 23B is large, it is considered that few toner particles reach the seal member 30. Therefore, when the length T is greater than 10 mm, it is still expected that there is no leakage of toner.

From another point of view, the central portion 23A to which toner is likely to stick is preferably located far from the seal member 30. From the results of FIGS. 3 and 4, it is found that the length T of each end portion 23B is preferably longer than the contact length C between each end portion 23B of the surface layer 23 of the developing roll 20 and the seal member 30, and T-C is preferably greater than or equal to 5 mm. That is, the distance between the boundary between the central portion 23A made of a urethane resin (the coefficient of kinetic friction of the outer peripheral surface is high and the ten-point average roughness $R_z$ is large) and each end portion 23B made of a silicone resin (the coefficient of kinetic friction of the outer peripheral surface is low and the ten-point average roughness $R_z$ is small) of the surface layer 23 and a part of the end portion 23B that contacts the seal member 30 surrounding the end portion 23B is preferably greater than or equal to 5 mm.

OTHER MODIFIED EXAMPLES

Although the present disclosure has been described by way of its preferred embodiments with reference to the drawings, one of ordinary skill in the art would understand that any changes to the form and the details of the disclosure are possible without departing from the scope of the claimed disclosure. Such changes, alterations, and modifications should be encompassed within the scope of the present disclosure.

The invention claimed is:

1. A developing roll for use in an image-forming apparatus that uses electrophotography, comprising:

a cylindrical core made of metal;

an annular elastic layer made of rubber and arranged around the core; and an annular surface layer arranged around the elastic layer, wherein:

the surface layer includes a central portion and end portions, the central portion being located at a center of the developing roll in a longitudinal direction, the end portions being located at opposite end portions of the developing roll in the longitudinal direction, a coefficient of kinetic friction of the central portion of the surface layer is higher than the coefficient of kinetic friction of each end portion of the surface layer, and a ten-point average roughness $R_z$ of the central portion of the surface layer is greater than the ten-point average roughness $R_z$ of each end portion of the surface layer, a coefficient of kinetic friction of an outer peripheral surface of each end portion of the surface layer is less than or equal to 0.1, and a ten-point average roughness $R_z$ of the outer peripheral surface of each end portion of the surface layer is less than or equal to 1.8 μm, and the central portion of the surface layer is made of a urethane resin, and each end portion of the surface layer is made of a silicone resin.

2. The developing roll according to claim 1, wherein:

each end portion is adapted to be surrounded by a seal member, and a distance between a boundary between the central portion and each end portion and a part of each end portion that contacts the seal member is greater than or equal to 5 mm.

3. A developing device comprising:

the developing roll according to claim 2;

a toner container adapted to have the developing roll partly arranged therein, and store toner particles; and the seal member supported and secured on the toner container, the seal member being adapted to reduce leakage of toner particles from the toner container.

4. The developing device according to claim 3, wherein the seal member is made of a nonwoven fabric.

* * * * *